US010149584B2

(12) United States Patent
Li

(10) Patent No.: US 10,149,584 B2
(45) Date of Patent: Dec. 11, 2018

(54) PNEUMATIC TOOL

(71) Applicant: GISON MACHINERY CO., LTD., Taichung (TW)

(72) Inventor: Kuang-Tai Li, Taichung (TW)

(73) Assignee: GISON MACHINERY CO., LTD., Taichung (TW)

( * ) Notice: Subject to any disclaimer, the term of this patent is extended or adjusted under 35 U.S.C. 154(b) by 537 days.

(21) Appl. No.: 14/978,610

(22) Filed: Dec. 22, 2015

(65) Prior Publication Data

US 2017/0042396 A1 Feb. 16, 2017

(30) Foreign Application Priority Data

Aug. 11, 2015 (TW) ............................ 104126120 A

(51) Int. Cl.

| | |
|---|---|
| ***B23P 19/00*** | (2006.01) |
| ***A47L 5/14*** | (2006.01) |
| ***A47L 7/00*** | (2006.01) |
| ***A47L 9/08*** | (2006.01) |
| ***B08B 5/02*** | (2006.01) |
| ***B08B 5/04*** | (2006.01) |

(52) U.S. Cl.

CPC ................ *A47L 5/14* (2013.01); *A47L 7/009* (2013.01); *A47L 9/08* (2013.01); *B08B 5/02* (2013.01); *B08B 5/04* (2013.01)

(58) Field of Classification Search

CPC ....... B25B 11/00; B25B 11/005; B25B 11/02; B23Q 3/068; B23Q 5/145; B23Q 11/046; B23Q 11/005; B23Q 35/16; A47L 5/00; A47L 5/14; A47L 9/0036; A47L 9/0027

See application file for complete search history.

(56) References Cited

U.S. PATENT DOCUMENTS 4,887,450 A * 12/1989 Gast ....................... B21J 15/105 29/243.523
5,074,006 A * 12/1991 Eremita ............... A01K 13/002 15/344
5,267,371 A * 12/1993 Soler ......................... A47L 5/36 15/327.5
5,329,666 A * 7/1994 Bowerman ............... A47L 5/26 15/323
5,761,785 A * 6/1998 Connolly ............. B23P 19/045 269/21

(Continued)

FOREIGN PATENT DOCUMENTS

CN 204134978 U 1/2002
CN 2468945 Y 2/2015

*Primary Examiner* — Lee D Wilson

(74) *Attorney, Agent, or Firm* — Guice Patents PLLC

(57) ABSTRACT

A pneumatic tool includes: a main body; an air passage disposed in the main body for air to flow in; an air exhaustion passage disposed in the main body, one end of the air exhaustion passage communicating with the air passage, the other end of the air exhaustion passage being an air exhaustion end; a flow way disposed in the main body, a rear end of the flow way communicating with the air passage, a front end of the flow way being positioned at one end of the main body; and a control mechanism disposed in the main body and connected with the air exhaustion passage. The pneumatic tool provides both blowing and sucking effects. An operator need not replace the tool. Instead, the operator can use the pneumatic tool to blow dust or take an article.

16 Claims, 9 Drawing Sheets

(56) References Cited

U.S. PATENT DOCUMENTS

| | | | | |
|---|---|---|---|---|
| 2013/0318741 | A1* | 12/2013 | Moyher, Jr. | A47L 5/362<br>15/327.1 |
| 2017/0042396 | A1* | 2/2017 | Li | A47L 5/14 |

* cited by examiner

PNEUMATIC TOOL

BACKGROUND OF THE INVENTION

1. Field of the Invention

The present invention relates generally to a pneumatic tool, and more particularly to a pneumatic tool having both blowing and sucking effects.

2. Description of the Related Art

It is known that there are various pneumatic tools used in various sites. For example, a dust blower is operated with high-pressure air as the power source. After processing a work piece, the dust blower serves to blow off the dust or the chips accumulating on a working table face, enabling a user to conveniently clean up the working table face.

In addition, it is dangerous to take articles in many manufacturing sites. For example, it is dangerous to place an article to be processed into a mold or take a product out of a mold. Therefore, an operator needs a grasping tool for taking and moving the article without directly using his hand to take the article. In this case, the operator is protected from being clamped by the mold and the danger of injury of the operator can be avoided.

It can be known from the above that both the dust blower and the grasping tool are auxiliary tools often used in many sites, especially in manufacturing sites. However, no conventional tool can provide integrated dust blowing and article taking functions. As a result, an operator needs to respectively use two kinds of tools to blow dust and take the article. It is quite inconvenient for the operator to use the tools.

SUMMARY OF THE INVENTION

It is therefore a primary object of the present invention to provide a pneumatic tool, which can provide both dust blowing and article sucking/taking effects.

It is a further object of the present invention to provide the above pneumatic tool, which can be easily operated to switch between a sucking mode and a blowing mode.

The pneumatic tool of the present invention includes:

a main body;

an air passage disposed in the main body, whereby an air source can flow into the air passage to form a fast airflow;

an air exhaustion passage disposed in the main body, one end of the air exhaustion passage communicating with the air passage, the other end of the air exhaustion passage being for exhausting air out of the main body;

a flow way disposed in the main body, the flow way having an inner end and an outer end, the inner end of the flow way communicating with the air passage, the outer end of the flow way being positioned at one end of the main body, the position where the flow way communicates with the air passage is positioned between the rear end (air intake end) of the air passage and the front end (air exhaustion end) of the air passage; and a control mechanism disposed in the main body and connected with the air exhaustion passage. The control mechanism is operable between an open position and a close position. When the control mechanism is positioned in the open position, the air exhaustion passage is in a free state. When the control mechanism is positioned in the close position, the control mechanism blocks the air exhaustion passage.

Preferably, the pneumatic tool further includes a sucker. The outer end of the flow way is connected with the sucker, whereby the air in the sucker can flow through the flow way to the air passage.

Accordingly, by means of the control mechanism, the pneumatic tool can be switched between an article sucking/taking mode and a dust blowing mode. When the air exhaustion passage is in the free state, the air in the tool is exhausted from the air exhaustion passage, and the air in the flow way flows toward the air exhaustion passage, a sucking effect is achieved. When the air exhaustion passage is blocked, the air is exhausted from the outer end of the flow way, a blowing effect is achieved. Both the blowing and sucking effects occur in the flow way.

The pneumatic tool of the present invention has integrated dust blowing and article sucking/taking functions. Therefore, it is unnecessary for an operator to replace the tool. Instead, the operator simply needs to easily operate the control mechanism to switch the use mode of the pneumatic tool. Accordingly, the pneumatic tool can be more conveniently used.

The present invention can be best understood through the following description and accompanying drawings, wherein:

DETAILED DESCRIPTION OF THE PREFERRED EMBODIMENTS

Figure 1:
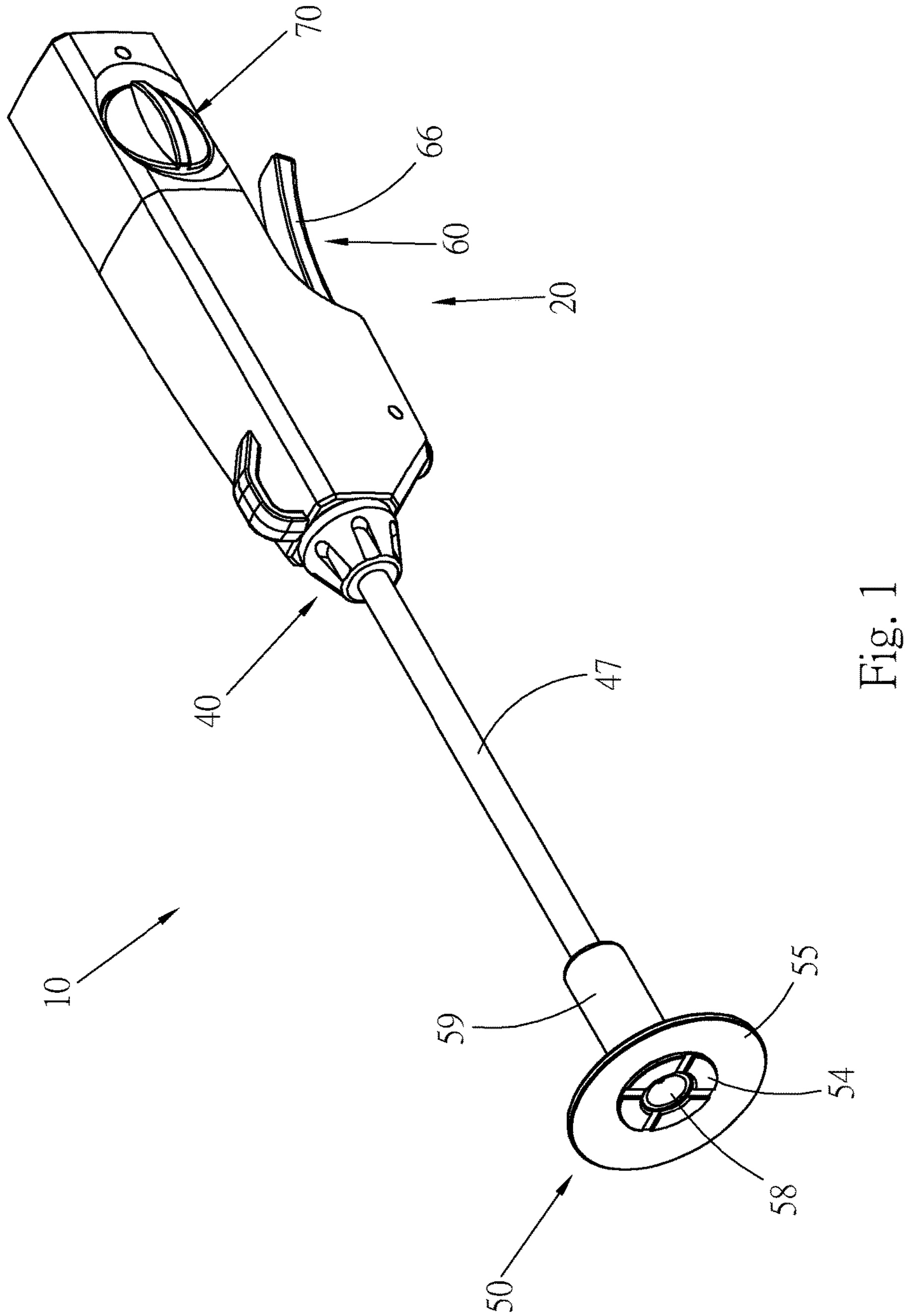
FIG. 1 is a perspective view of a first embodiment of the pneumatic tool of the present invention.
Figure 2:
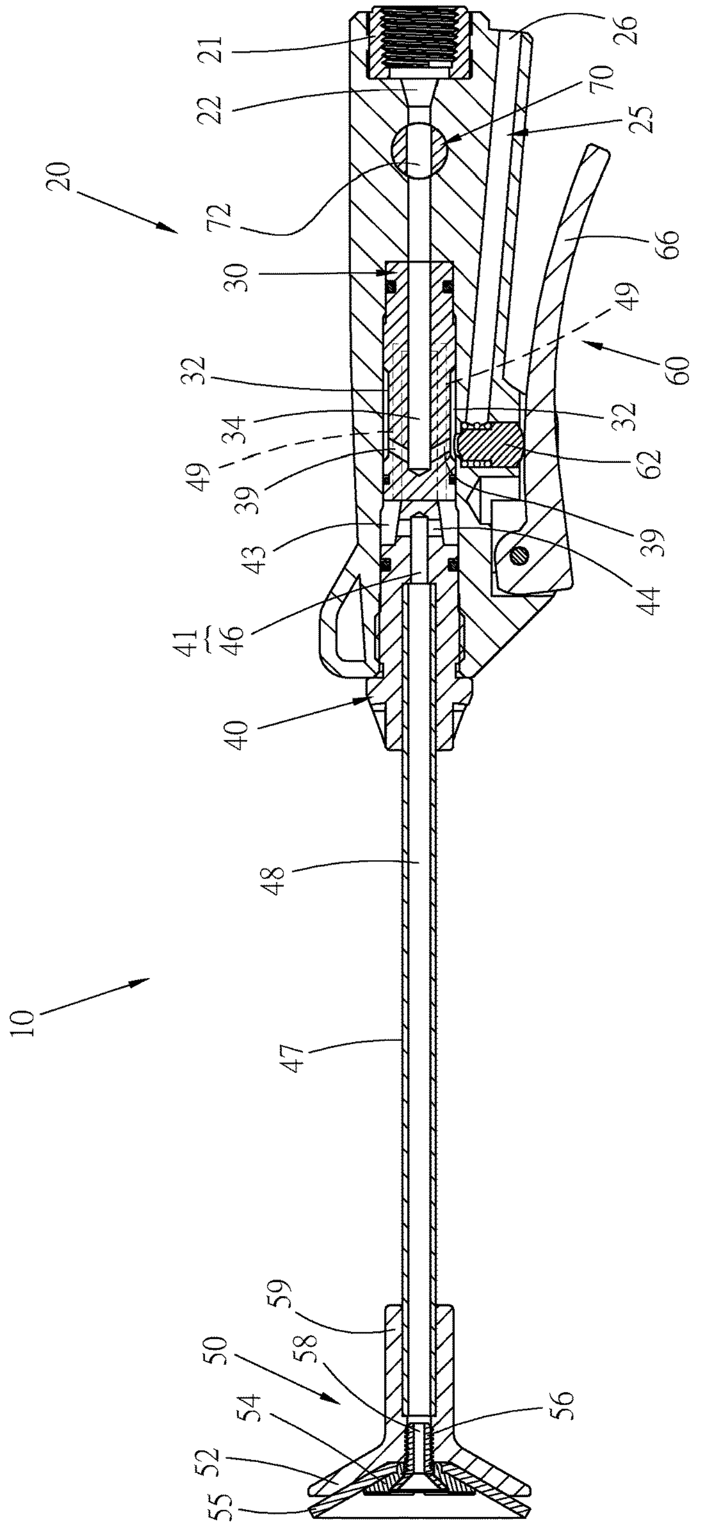
FIG. 2 is a longitudinal sectional view of the first embodiment of the pneumatic tool of the present invention according to FIG. 11
Figure 3:
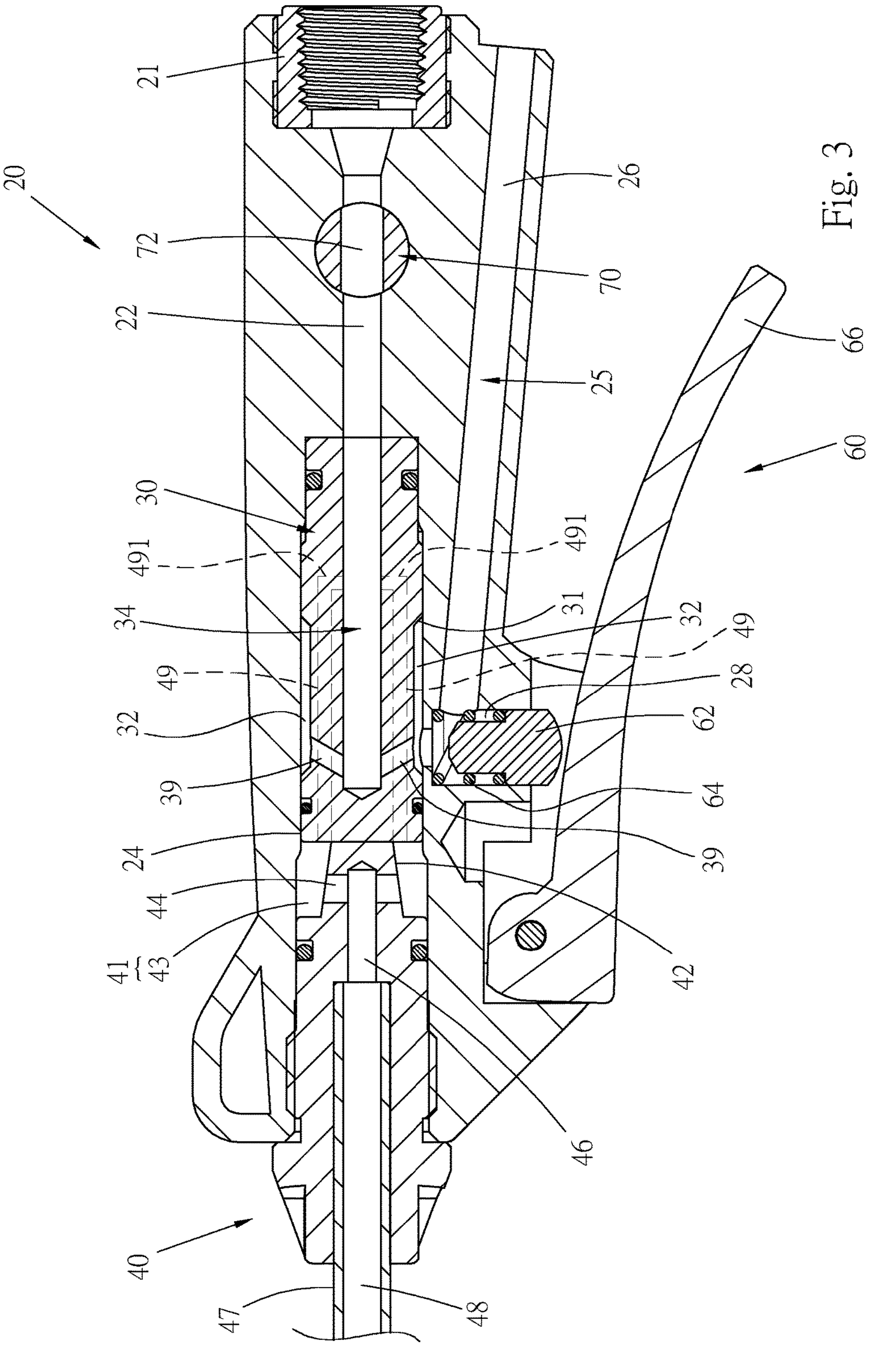
FIG. 3 is an enlarged view of a part of FIG. 2.

Please refer to FIGS. 1 to 3. According to a first embodiment, the pneumatic tool 10 of the present invention includes a main body 20 having a connector 21 disposed at a rear end of the main body 20 for connecting with a high-pressure air supply. A receiving space 24 is formed in the main body 20. A rear end of the receiving space 24 communicates with a front end of an air intake passage 22. In this embodiment, a front end of the receiving space 24 passes through the main body 20 to a front end of the main body 20. An air exhaustion passage 25 is disposed in the main body 20. The air exhaustion passage 25 includes an air exhaustion passageway 26. A front end of the air exhaustion passageway 26 communicates with the receiving space 24. A rear end of the air exhaustion passageway 26 is an air exhaustion end for exhausting air out of the main body. A valve hole 28 is formed under a bottom face of the main body 20 and positioned between the receiving space 24 and the air exhaustion passageway 26. In this embodiment, the valve hole 28 communicates with the air exhaustion passageway 26.

An air passage 34 and a flow way 41 are formed in the main body 20. The air passage 34 and the flow way 41 together with the air exhaustion passage 25 form an airflow way of the pneumatic tool for operation. The air passage 34 and the flow way 41 will be further described hereinafter.

Figure 4:
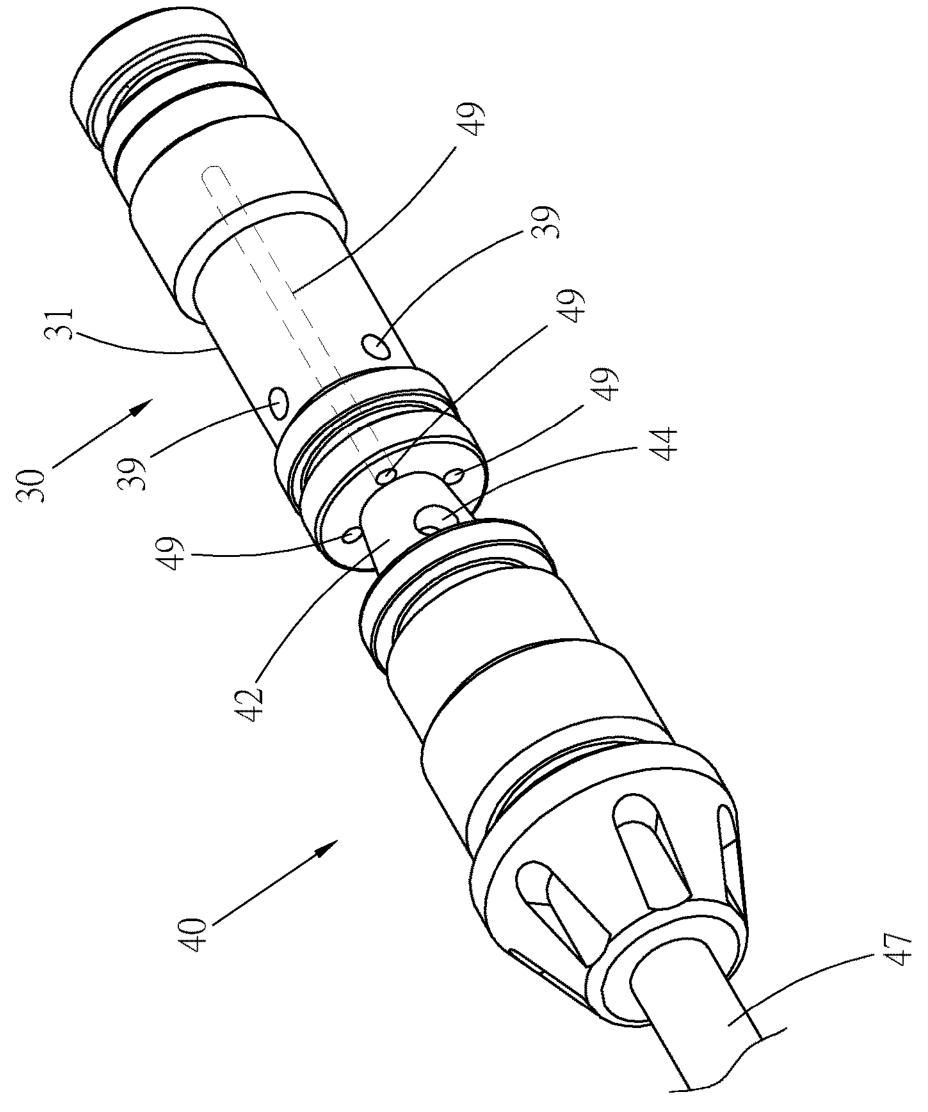
FIG. 4 is a perspective view of the valve body of the first embodiment of the pneumatic tool of the present invention.

Please refer to FIGS. 3 and 4. A valve body 30 is airtight received in the receiving space 24 of the main body 20 via airtight members. An annular recessed section 31 is formed on an outer circumference of the valve body 30. An annular air chamber 32 is defined between the annular recessed section 31 and a wall face of the receiving space 24. The front end of the air exhaustion passageway 26 communicates with the annular air chamber 32.

The air passage 34 is disposed in the valve body 30. A rear end of the air passage 34 is an air inlet end in communication with the connector 21 via the air intake passage 22. A fast airflow can be created in the air passage 34 such as by, but not limited to, a nozzle. In this embodiment, the air passage 34 is only an example for illustrating the airflow way. In practice, any design or structure that can create a fast airflow in the air passage 34 is applicable to the air passage 34 of the present invention.

At least one, for example, two or four flow guide holes 39 are formed in the valve body 30 substantially in a radial direction of the valve body. Inner ends of the flow guide holes 39 communicate with the front end of the air passage 34. (The front end of the air passage is an air outlet end of the air passage). Outer ends of the flow guide holes 39 communicate with the annular air chamber 32 as shown in FIG. 3. The air exhaustion passageway 26, the annular air chamber 32 and the flow guide hole 39 together form the air exhaustion passage 25.

Please refer to FIGS. 3 and 4. A cylindrical end piece 40 is airtight received in the front end of the receiving space 24 of the main body 20 and positioned in front of the valve body 30. A rear end of the end piece 40 has a protrusion section 42. An annular cavity 43 is defined between the protrusion section 42 and the wall face of the receiving space 24. The end piece 40 is formed with a passage 46 inward extending from a front end of the end piece 40. At least one communication hole 44 is radially formed on the protrusion section 42. A rear end of the passage 46 communicates with the annular cavity 43 via the communication hole 44. The first embodiment of the present invention further includes a tube body 47. A rear end of the tube body 47 is mounted in the passage 46 of the end piece 40. The tube body 47 is formed with an internal passage 48 in communication with the passage 46. The internal passage 48 is an extension of the passage 46. In this embodiment, the valve body 30 is formed with at least one, for example, four guiding holes 49 inward longitudinally extending from the front end of the valve body 30. A rear end 491 of the guiding hole 49 communicates with the air passage 34. As shown in FIG. 3, the position where the guiding holes 49 communicate with the air passage 34 is positioned between the front and rear ends of the air passage. Front ends of the guiding holes 49 communicate with the annular cavity 43 as shown in FIG. 3. According to such structure, the passage 46, the communication hole 44, the annular cavity 43 and the guiding holes 49 communicate with each other to form the flow way 41. The passage 46 is the front end of the flow way 41. The rear end of the flow way, (that is, the rear ends 491 of the guiding holes 49), communicate with the air passage 34. The position where the air exhaustion passage 25 connects with the air passage 34, (that is, the position where the flow guide holes 39 connect with the air passage 34), is positioned in front of the position where the rear end of the flow way 41 connects with the air passage 34, (that is, the position where the guiding holes 49 connect with the air passage 34).

Figure 5:
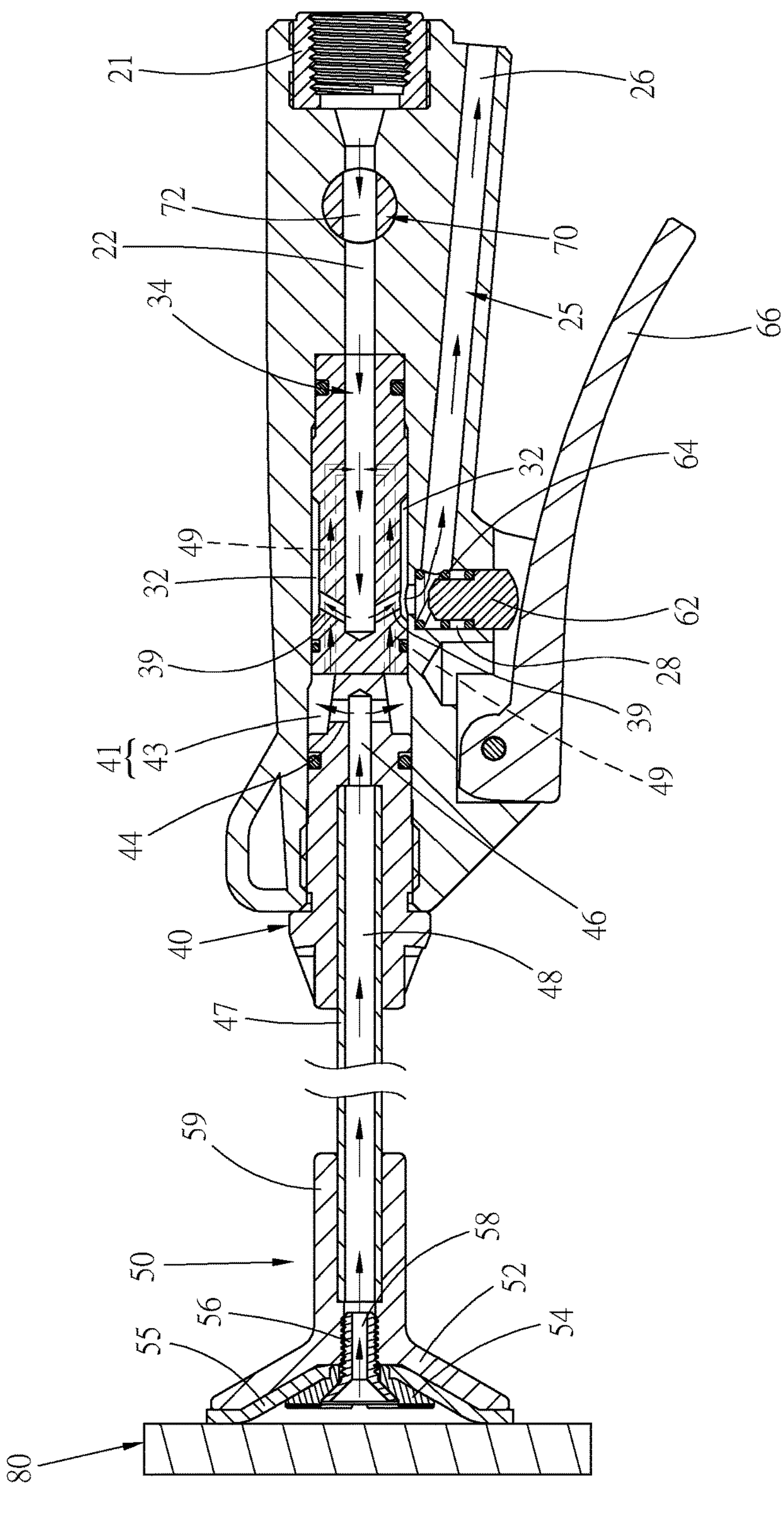
FIG. 5 is a sectional view showing that the pneumatic tool of the present invention is operated to suck and take an article.

A sucker 50 is disposed at the front end of the tube body 47, as shown in FIGS. 2 and 5. The sucker 50 has a conic sucker body 52, a holding member 54, a flexible tray body 55 and a hollow connection member 56. The tray body 55 is made of rubber or silicone material. The connection member 56 passes through the holding member 54, the tray body 55 and the sucker body 52 to assemble the three components with each other. The holding member 54 and the tray body 55 are positioned on an inner surface of the sucker body 52. A sleeve 59 is disposed on the sucker body 52. The sleeve 59 of the sucker 50 is fitted on one end of the tube body 47. The connection member 56 is formed with an internal passageway 58 extending in an axial direction of the sucker 50 through the sucker body 52, the holding member 54 and the tray body 55 to communicate with the passage 46. The sucker mounted on the pneumatic tool 10 is not limited to the sucker 50 of this embodiment.

Figure 7:
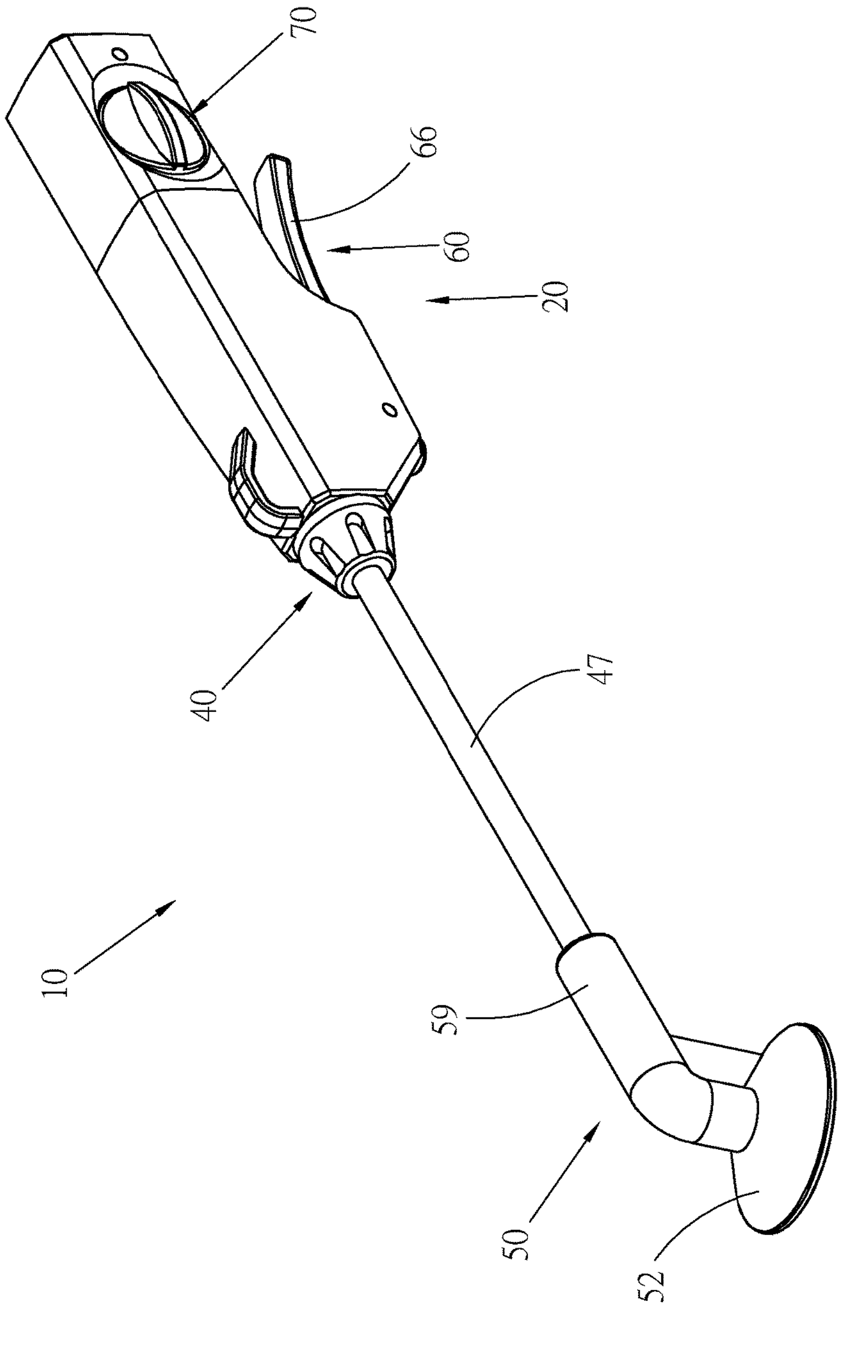
FIG. 7 is a perspective view of a second embodiment of the pneumatic tool of the present invention.

The sleeve 59 of the sucker 50 is not limited to a straight tubular body. Alternatively, the sleeve 59 can have the form of a bent tube as shown in FIG. 7. In this case, an angle is contained between the sucker face of the sucker 50 and the longitudinal direction of the pneumatic tool.

Please refer to FIG. 3. A control mechanism 60 is disposed on a circumferential face, such as the bottom face, of the main body 20. The control mechanism 60 includes a valve member 62, an elastic member 64 and a control member 66. The control member 66 is a trigger and will be referred to as the trigger hereinafter. The valve member 62 is disposed in the valve hole 28 of the main body 20 and is operable along the valve hole between an open position and a close position. The elastic member 64 is a spring disposed in the valve hole 28 to elastically abut against the valve member 62. In normal state, the elastic member 64 makes the valve member 62 move downward to the open position to keep the air exhaustion passage 25 open. The trigger 66 is pivotally disposed under the bottom face of the main body 20 and is swingable. When shifting the trigger 66, the trigger 66 can touch and move the bottom end of the valve member 62 to drive the valve member 62 to move toward the close position. Another elastic member (not shown) can be additionally disposed between the main body 20 and the trigger 66 to elastically abut against the trigger 66. In this case, when free from any pressing force, the trigger 66 keeps in an outward stretching state.

A switch is disposed in the main body 20. In this embodiment, the switch is a rotary button 70 formed with a perforation 72 in communication with the air intake passage 22. The rotary button 70 is operable between an open position and a close position. When the rotary button 70 is positioned in the open position, the perforation 72 communicates with the air intake passage 22, permitting air to flow through the air intake passage 22. When the rotary button 70 is positioned in the close position, the perforation 72 is perpendicular to the air intake passage 22 to block the air intake passage 22.

The pneumatic tool 10 of the present invention can be used in a sucking mode and a blowing mode. In use, a high-pressure air pipeline is connected with the connector 21 of the main body 20. Please refer to FIG. 5. When an operator desires to suck an article 80 to be taken, the operator rotates the rotary button 70 to the open position to communicate the perforation 72 of the rotary button with the air intake passage 22. Under such circumstance, the high-pressure air can flow from the air intake passage 22 into the air passage 34 to operate the pneumatic tool. The operator holds the main body 20 without pressing the trigger 66 of the control mechanism 60 so that the valve member 62 is positioned in the open position to keep the air exhaustion passage 25 free. After the high-pressure air flows into the air passage 34, the high-pressure air further flows from the flow guide holes 39 of the air exhaustion passage 25 into the annular air chamber 32 and is exhausted out of the main body 20 through the air exhaustion passageway 26. According to Bernoulli's principle, the air in the flow way 41 is sucked into the air passage 34, whereby the outer end of the flow way 41 creates sucking force, enabling the sucker 50 at the front end of the pneumatic tool 10 to suck and take the article.

The air in the air passage 34 flows faster with a lower pressure. In comparison with the air passage, the air in the flow way 41 flows more slowly with a higher pressure. Under the effect of pressure difference, the air in the flow way will flow toward the air passage to make the sucker 50 at the front end of the tube body 47 create sucking force. In this case, the pneumatic tool 10 can suck the article 80 to be taken. The air sucked from the flow way 41 into the air passage 34 is exhausted out of the main body 20 through air exhaustion passage 25.

The pneumatic tool 10 can also provide sucking force in a liquid. The sucker 50 can be positioned in water to suck and move an article in the liquid. The present invention employs high-pressure air as the power source so that the danger of getting an electric shock can be avoided.

Figure 6:
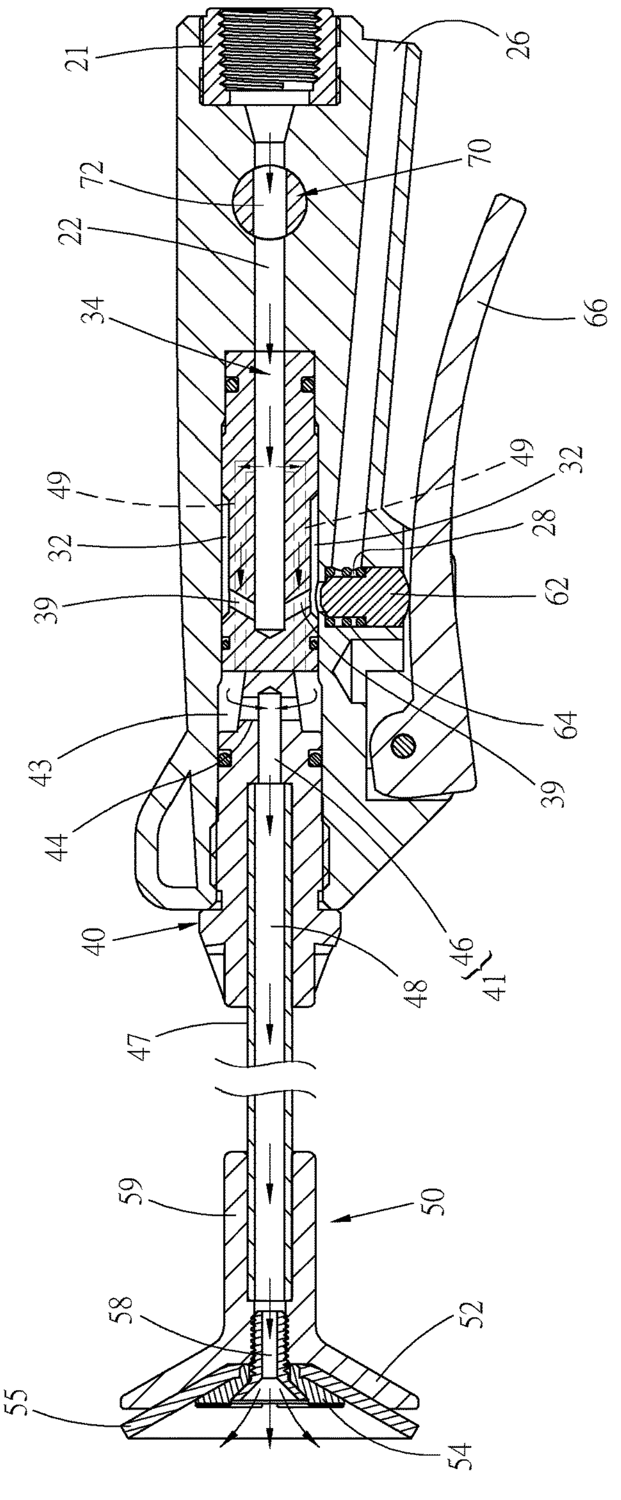
FIG. 6 is a sectional view showing that the pneumatic tool of the present invention is operated to blow dust.

Please refer to FIG. 6. When the pneumatic tool is used as a blowing tool, the rotary button 70 is rotated to the open position for the high-pressure air to flow in. Then, the trigger 66 of the control mechanism 60 is pressed to drive the valve member 62 to the close position and close the valve hole 28 and thus block the air exhaustion passageway 26. Under such circumstance, the high-pressure air cannot be exhausted from the air exhaustion passage 25 to instead flow out from the flow way 41.

To speak more specifically, when the air exhaustion passageway 26 is blocked, the flow guide holes 39 and the annular air chamber 32 become a closed path and the high-pressure air in the air passage 34 cannot be exhausted from the air exhaustion passageway 26. Under such circumstance, the high-pressure air flows into the guiding holes 49 of the flow way 41 and then flows forward to the annular cavity 43 to flow through the communication hole 44 into the passage 46. Finally, the high-pressure air is exhausted from the passage 58 of the sucker 50 to provide a dust blowing effect.

Accordingly, the pneumatic tool 10 can blow out air to blow off the dust, cutting chips or other impurities on the working table face and achieve an effect as a conventional dust blower. In the present invention, both blow and suction of the pneumatic tool occur in the flow way.

Figure 8:
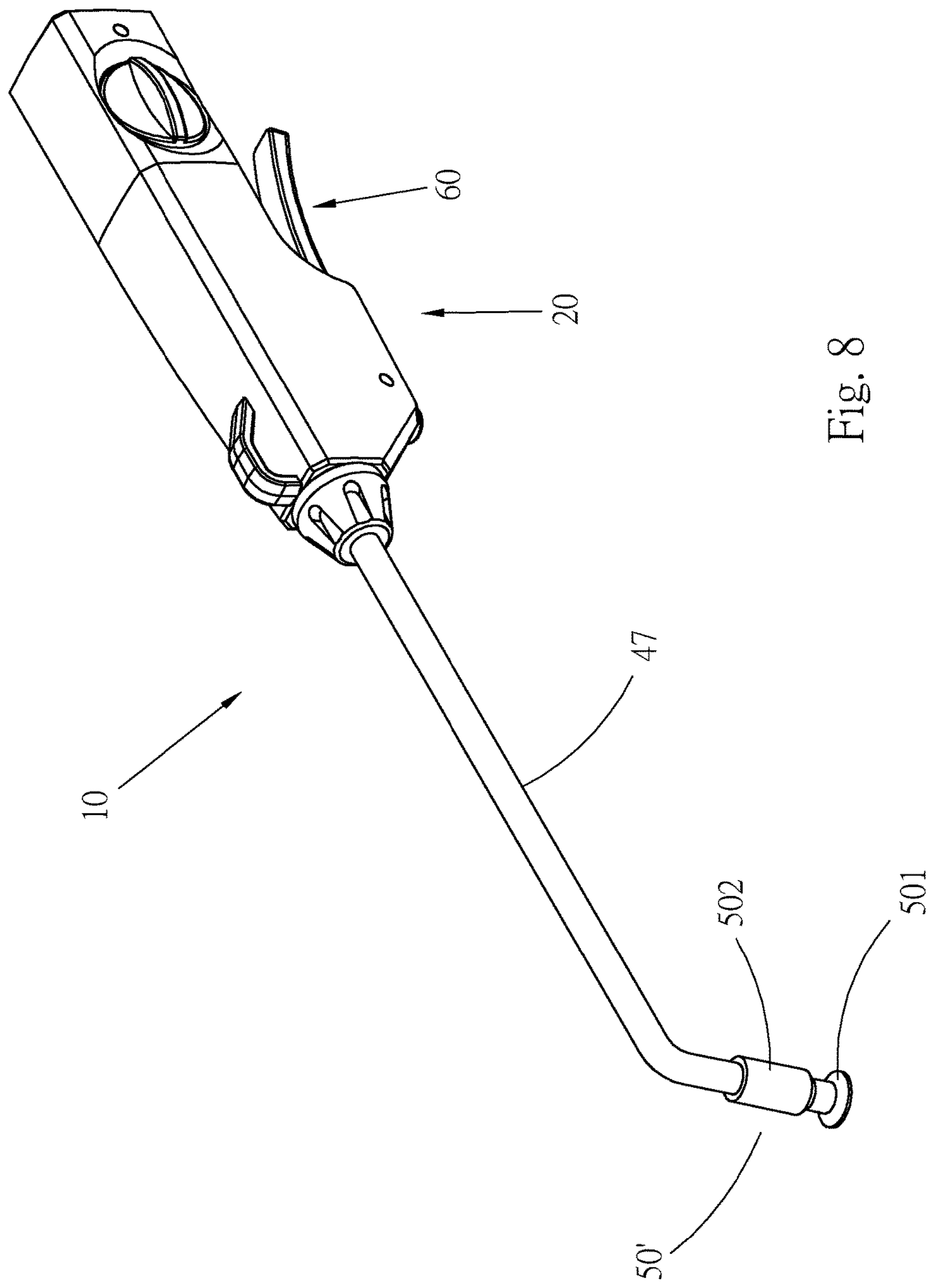
FIG. 8 is a perspective view of a third embodiment of the pneumatic tool of the present invention.
Figure 10:
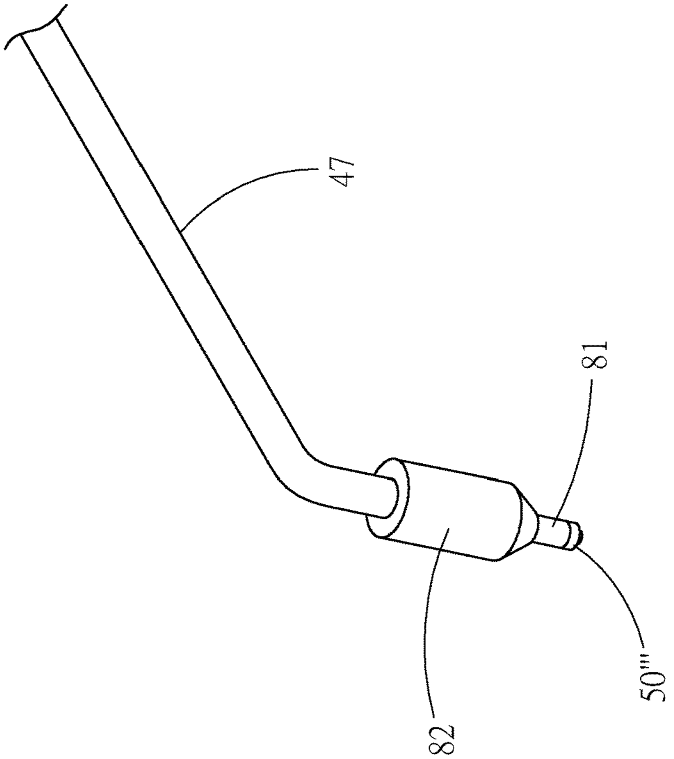
FIG. 10 is a perspective view of a part of a fifth embodiment of the pneumatic tool of the present invention.
Figure 9:
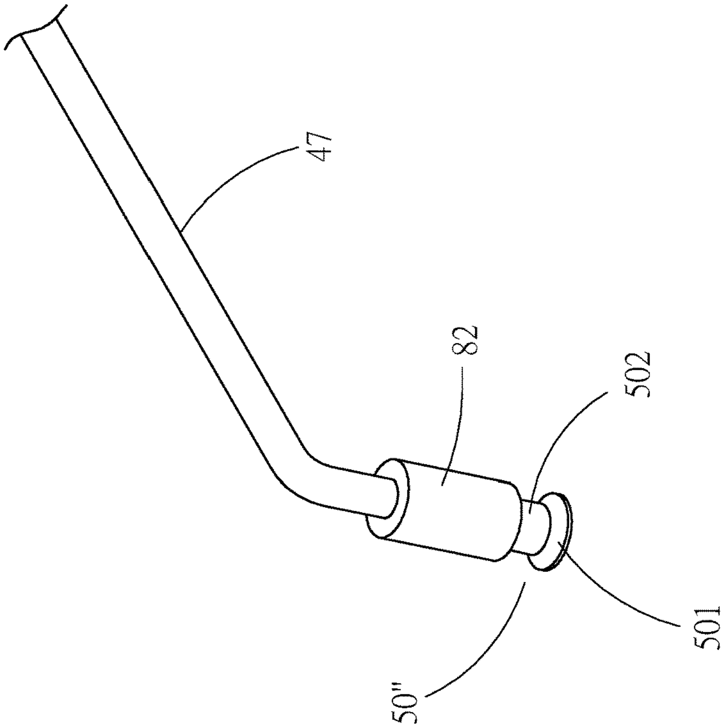
FIG. 9 is a perspective view of a part of a fourth embodiment of the pneumatic tool of the present invention.

FIGS. 8 to 10 show a third embodiment, a fourth embodiment and a fifth embodiment of the present invention. The same components are denoted with the same reference numerals. These embodiments are different from the first embodiment in that different suckers are used in these embodiments. The suckers are all made of soft material. Each sucker is formed with an internal axial passage for air to flow through. In FIG. 8, the sucker 50' has a sucker body 501 and a cylindrical section 502. The cylindrical section 502 of the sucker is fitted on the tube body 47.

In FIG. 9, the sucker 50" also has a sucker body 501 and a cylindrical section 502. The cylindrical section 502 is fixed at one end of the tube body 47 via a sleeve 82.

In FIG. 10, the sucker"' has a small diameter and is mounted at a front end of a slender tube body 81. The tube body 81 is connected with the tube body 47 via a sleeve 82. The tube body 81 and the sleeve 82 can be identical components or different components.

Please refer to the attachments, which are four films showing the operation of the pneumatic tool of the present invention. It is revealed from the films that when the pneumatic tool is used to provide sucking function, different articles made of different materials with different weights can be sucked and taken. When the function of the pneumatic tool is switched to the blowing function, the pneumatic tool can blow an article. Therefore, the structure and the technical characteristic of the present invention can truly achieve the object of the present invention and provide the use effect.

In use of the pneumatic tool of the present invention, it is unnecessary for an operator to replace the tool. Instead, the operator simply needs to press or release the trigger of the pneumatic tool to switch the use mode of the pneumatic tool between sucking and blowing. Accordingly, the pneumatic tool can be conveniently operated to achieve the dust blowing and article taking effects.

The above embodiments are only used to illustrate the present invention, not intended to limit the scope thereof. Many modifications of the above embodiments can be made without departing from the spirit of the present invention.

What is claimed is:

1. A pneumatic tool comprising:

a main body;

an air passage disposed in the main body, a rear end of the air passage being for air to flow into the main body;

an air exhaustion passage disposed in the main body, one end of the air exhaustion passage communicating with the air passage, the other end of the air exhaustion passage being an air exhaustion end for exhausting air out of the main body;

a flow way disposed in the main body, the flow way having a front end and a rear end, the rear end of the flow way communicating with the air passage, the front end of the flow way being positioned at one end of the main body; and a control mechanism disposed in the main body and connected with the air exhaustion passage, the control mechanism being operable between an open position and a close position, when the control mechanism is positioned in the open position, the air exhaustion passage being in a free state, the air being exhausted from the air exhaustion passage, and the air in the flow way flows toward the air exhaustion passage; when the control mechanism is positioned in the close position, the control mechanism blocking the air exhaustion passage, the air being exhausted from the flow way.

2. The pneumatic tool as claimed in claim 1, further comprising a sucker formed with a passage, the sucker being disposed at the front end of the flow way with the passage of the sucker communicating with the flow way.

3. The pneumatic tool as claimed in claim 1, wherein:

a receiving space is formed in the main body; and a valve body being received in the receiving space of the main body; the air passage being disposed in the valve body.

4. The pneumatic tool as claimed in claim 2, wherein:

a receiving space is formed in the main body; and a valve body being received in the receiving space of the main body; the air passage being disposed in the valve body.

5. The pneumatic tool as claimed in claim 3, wherein the air exhaustion passage has an air exhaustion passageway, one end of the air exhaustion passageway of the air exhaustion passage communicating with the air passage.

6. The pneumatic tool as claimed in claim 4, wherein the air exhaustion passage has an air exhaustion passageway, one end of the air exhaustion passageway of the air exhaustion passage communicating with the air passage.

7. The pneumatic tool as claimed in claim 1, wherein a valve hole is formed on a circumference of the main body in communication with the air exhaustion passageway; the control mechanism including a valve member and a control member, the valve member being disposed in the valve hole and operable between an open position and a close position, when the valve member is positioned in the close position, the valve member blocking the air exhaustion passageway; the control member being disposed on the main body for driving the valve member to move.

8. The pneumatic tool as claimed in claim 2, wherein a valve hole is formed on a circumference of the main body in communication with the air exhaustion passageway; the control mechanism including a valve member, an elastic member and a control member, the valve member being disposed in the valve hole and operable between an open position and a close position, when the valve member is positioned in the close position, the valve member blocking the air exhaustion passageway, the elastic member being disposed between the valve member and the valve hole to provide elastic energy for keeping the valve member moving downward to the open position, the control member being disposed on the main body for driving the valve member to move.

9. The pneumatic tool as claimed in claim 1, further comprising: a tube body, one end of the tube body being positioned at the front end of the main body; and a sucker formed with an axial passage, the sucker being disposed at the other end of the tube body, the passage of the sucker communicating with the flow way via the tube body.

10. The pneumatic tool as claimed in claim 2, further comprising: a tube body, one end of the tube body being positioned at the front end of the main body; the sucker being disposed at the other end of the tube body, the passage of the sucker communicating with the flow way via the tube body.

11. The pneumatic tool as claimed in claim 3, further comprising an end piece disposed in the receiving space of the main body and positioned in front of the valve body, the front end of the flow way being positioned in the end piece.

12. The pneumatic tool as claimed in claim 11, wherein the end piece is formed with a passage inward extending from a front end of the end piece, the passage being the front end of the flow way; the pneumatic tool further comprising: a tube body, one end of the tube body being connected with the passage of the end piece; and a sucker formed with an axial passage, the sucker being disposed at the other end of the tube body, the passage of the sucker communicating with the flow way via the tube body.

13. The pneumatic tool as claimed in claim 12, wherein the rear end of the end piece has a protrusion section; an annular cavity being defined between the protrusion section and a wall face of the receiving space; at least one communication hole being formed on the protrusion section in communication with the annular cavity and passage; the valve body being formed with at least one guiding hole inward extending from the front end of the valve body, a front end of the guiding hole communicating with the annular cavity, a rear end of the guiding hole communicating with the air passage; the passage, the annular cavity, the at least one communication hole and the at least one guiding hole together forming the flow way.

14. The pneumatic tool as claimed in claim 3, wherein the air exhaustion passage includes an annular space, at least one flow guide hole and an air exhaustion passageway, the annular space being defined between the valve body and a wall face of the receiving space; one end of the flow guide hole being connected with the air passage, the other end of the flow guide hole communicating with the annular space; one end of the air exhaustion passageway communicating with the annular space, the other end of the air exhaustion passageway being the air exhaustion end of the air exhaustion passage; when the control mechanism is positioned in the close position, the control mechanism blocking the air exhaustion passageway.

15. The pneumatic tool as claimed in claim 1, wherein the position where the flow way communicates with the air passage is positioned behind the position where the air exhaustion passage communicates with the air passage.

16. The pneumatic tool as claimed in claim 2, wherein the sucker has a conic sucker body and a flexible tray body, the tray body being mounted on an inner surface of the sucker body, the passage extending through the sucker body and the tray body.

* * * * *